(12) United States Patent
Duan

(10) Patent No.: US 12,536,825 B2
(45) Date of Patent: Jan. 27, 2026

(54) TEXT MATTING METHOD AND APPARATUS BASED ON NEURAL NETWORK, DEVICE, AND STORAGE MEDIUM

(71) Applicant: BOE TECHNOLOGY GROUP CO., LTD., Beijing (CN)

(72) Inventor: Ran Duan, Beijing (CN)

(73) Assignee: BOE Technology Group Co., LTD, Beijing (CN)

( * ) Notice: Subject to any disclaimer, the term of this patent is extended or adjusted under 35 U.S.C. 154(b) by 259 days.

(21) Appl. No.: 18/561,616

(22) PCT Filed: Dec. 23, 2022

(86) PCT No.: PCT/CN2022/141452
§ 371 (c)(1),
(2) Date: Nov. 16, 2023

(87) PCT Pub. No.: WO2024/130704
PCT Pub. Date: Jun. 27, 2024

(65) Prior Publication Data
US 2025/0087004 A1    Mar. 13, 2025

(51) Int. Cl.
G06V 30/19    (2022.01)
G06V 10/82    (2022.01)
G06V 30/16    (2022.01)

(52) U.S. Cl.
CPC ........ *G06V 30/19127* (2022.01); *G06V 10/82* (2022.01); *G06V 30/16* (2022.01); *G06V 30/19147* (2022.01); *G06V 30/1918* (2022.01); *G06V 30/19193* (2022.01)

(58) Field of Classification Search
None
See application file for complete search history.

(56) References Cited

U.S. PATENT DOCUMENTS

| | | | |
|---|---|---|---|
| 2020/0074186 A1* | 3/2020 | Cao | G06V 20/53 |
| 2021/0232856 A1* | 7/2021 | Li | G06V 10/7715 |
| 2021/0287037 A1* | 9/2021 | Chen | G06V 10/454 |

FOREIGN PATENT DOCUMENTS

CN    112488106 A    3/2021

* cited by examiner

*Primary Examiner* — Edward Park
(74) *Attorney, Agent, or Firm* — LEASON ELLIS LLP

(57) ABSTRACT

The present disclosure provides a text matting method and apparatus based on a neural network, a device, and a storage medium. The text matting method based on a neural network includes: processing a first image with a feature extraction network to obtain feature maps, processing the feature maps with an intermediate processing network to obtain intermediate feature maps, processing the intermediate feature maps with a feature fusion network to obtain a second image, wherein the second image includes a text feature extracted from the first image.

16 Claims, 8 Drawing Sheets

Processing a first image with a feature extraction network to obtain feature maps, wherein, the feature extraction network comprises sequentially connected n extraction convolutional network blocks, and wherein a 1-st extraction convolutional network block processes the first image and outputs a 1-st feature map, and an i-th extraction convolutional network block processes an (i-1)-th feature map and outputs an i-th feature map — S101

Processing the feature maps with an intermediate processing network to obtain intermediate feature maps, wherein, the intermediate processing network comprises n spatial convolutional network blocks, a 1-st spatial convolutional network block processes the 1-st feature map and outputs a 1-st intermediate feature map, and an i-th spatial convolutional network block processes the i-th feature map and outputs an i-th intermediate feature map — S102

Processing intermediate feature maps with a feature fusion network to obtain a second image, wherein, the feature fusion network comprises sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n-i+1)-th intermediate feature map output by an (n-i+1)-th spatial convolutional network block and an (i-1)-th fusion map output by an (i-1)-th fusion convolutional network block to obtain an i-th fusion map, wherein an n-th fusion map output by an n-th fusion convolutional network block serves as the second image, and the second image comprises a text feature extracted from the first image — S103

FIG. 1

TEXT MATTING METHOD AND APPARATUS BASED ON NEURAL NETWORK, DEVICE, AND STORAGE MEDIUM

CROSS-REFERENCE TO RELATED PATENT APPLICATIONS

This application is a U.S. National Stage Application under 35 U.S.C. § 371 of International Patent Application No. PCT/CN2022/141452 filed Dec. 23, 2022, which is incorporated by reference in its entirety.

TECHNICAL FIELD

The present disclosure relates to a field of image processing, and more particularly, to a text matting method and apparatus based on a neural network, a device, and a storage medium.

BACKGROUND

Character recognition technology may detect and recognize text information in an image, for example, for applications such as determining text position and recognizing text meaning. However, pure character recognition is difficult to preserve personalized features such as artistic fonts and text styles that are specifically designed in the images such as posters and advertisements.

With development of artificial intelligence technology, artificial intelligence is widely applied in the field of image processing. Image processing may generally include processing tasks such as image modification and color adjustment, image beautification, image denoising, image super-resolution conversion, and feature extraction.

SUMMARY

Embodiments of the present disclosure provide a text matting method and apparatus based on a neural network, a device, and a storage medium; the neural network is used to perform text matting on a text included in an image, to obtain an output image that includes a complete text feature which preserves personalized features such as font and color of the text.

According to an aspect of the present disclosure, a text matting method based on a neural network is provided. The method includes: processing a first image with a feature extraction network to obtain feature maps, wherein, the feature extraction network comprises sequentially connected n extraction convolutional network blocks, and wherein a 1-st extraction convolutional network block processes the first image and outputs a 1-st feature map, and an i-th extraction convolutional network block processes an (i−1)-th feature map and outputs an i-th feature map; processing the feature maps with an intermediate processing network to obtain intermediate feature maps, wherein, the intermediate processing network comprises n spatial convolutional network blocks, a 1-st spatial convolutional network block processes the 1-st feature map and outputs a 1-st intermediate feature map, and an i-th spatial convolutional network block processes the i-th feature map and outputs an i-th intermediate feature map; and processing intermediate feature maps with a feature fusion network to obtain a second image, wherein, the feature fusion network comprises sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n−i+1)-th intermediate feature map output by an (n−i+1)-th spatial convolutional network block and an (i−1)-th fusion map output by an (i−1)-th fusion convolutional network block to obtain an i-th fusion map, wherein an n-th fusion map output by an n-th fusion convolutional network block serves as the second image, and the second image comprises a text feature extracted from the first image, and wherein n is an integer greater than 1, and i is an integer greater than 1 but less than or equal to n.

According to embodiments of the present disclosure, the n extraction convolutional network blocks in the feature extraction network are each composed of one or more of a convolutional layer, a pooling layer and a residual convolutional block; and the n fusion convolutional network blocks in the feature fusion network are each composed of one or more of a convolutional layer, a residual convolutional block and a first connection layer; wherein the first connection layer comprises a feature merging layer and a super-resolution layer.

According to embodiments of the present disclosure, n is equal to 4; in the feature extraction network, the 1-st extraction convolutional network block is composed of a convolutional layer and a maximum pooling layer, a 2-nd extraction convolutional network block is composed of a residual convolutional block, a convolutional layer and a maximum pooling layer, a 3-rd extraction convolutional network block is composed of a residual convolutional block, a convolutional layer and a maximum pooling layer, and a 4-th extraction convolutional network block is composed of a residual convolutional block and a convolutional layer, wherein in the feature fusion network, a 1-st fusion convolutional network block is composed of a convolutional layer and a residual convolutional block, a 2-nd fusion convolutional network block is composed of a first connection layer, a convolutional layer and a residual convolutional block, a 3-rd fusion convolutional network block is composed of a first connection layer, a convolutional layer and a residual convolutional block, and a 4-th fusion convolutional network block is composed of a first connection layer and a convolutional layer, the first connection layer comprises a feature merging layer and a super-resolution layer.

According to embodiments of the present disclosure, the feature merging layer is used for merging a plurality of input images by increasing a number of image channels; and the super-resolution layer is used for increasing image size by reducing the number of image channels, the residual convolutional block is composed of a convolutional layer, a batch normalization layer and an activation function.

According to embodiments of the present disclosure, the n spatial convolutional network blocks have a same structure; each spatial convolutional network block of the n spatial convolutional network blocks comprises m parallel processing units and a second connection layer; the m processing units are respectively used for processing an input image; the second connection layer is used for merging processing results of the m processing units; the second connection layer comprises a feature merging layer, a convolutional layer and a batch normalization layer; and the feature merging layer is used for merging m images respectively output by the m processing units by increasing a number of image channels, wherein m is an integer greater than 1.

According to embodiments of the present disclosure, m is equal to 5; in each spatial convolutional network block, a 1-st processing unit is composed of a first convolutional layer and a batch normalization layer sequentially connected; a 2-nd processing unit is composed of a second convolutional layer, a batch normalization layer, a third convolutional layer and a batch normalization layer sequentially connected; a 3-rd processing unit is composed of a fourth convolutional layer, a batch normalization layer, a third convolutional layer and a batch normalization layer sequentially connected; a 4-th processing unit is composed of a fifth convolutional layer, a batch normalization layer, a third convolutional layer and a batch normalization layer sequentially connected; and a fifth processing unit is composed of a batch normalization layer, an adaptive average pooling layer, a third convolutional layer and an upsampling layer sequentially connected; and wherein the first convolutional layer, the second convolutional layer, the third convolutional layer, the fourth convolutional layer, and the fifth convolutional layer have different network parameters.

According to embodiments of the present disclosure, pixel points of the n-th fusion map are represented as text probability values located in an interval of 0 to 1, and are quantified as a grayscale image in an interval of 0 to 255.

According to embodiments of the present disclosure, the text matting method further includes: generating a training image set and annotating training images in the training image set to generate corresponding mask images; and training, based on a training function, the feature extraction network, the intermediate processing network and the feature fusion network with the training image set.

According to embodiments of the present disclosure, the generating the training image set comprises: constructing a corpus composed of text characters, a font database composed of text fonts, a texture feature database composed of text colors, and a background database composed of background pictures; and randomly selecting a group of a text character, a text font, a text color, and a background picture from the corpus, the font database, the texture feature database, and the background database, and forming a training image, wherein the text characters comprise Chinese characters and English characters; the text fonts comprise Chinese fonts and English fonts; and the text colors comprise solid colors, textures, and patterns.

According to embodiments of the present disclosure, the text matting method further includes: performing image processing on the text feature of the second image to generate a third image after text style conversion; and combining the third image with a target background image, to generate a fourth image after image style conversion.

According to embodiments of the present disclosure, the text matting method further includes: performing image processing on the second image, to generate a mask image having a same image size as the original image; and performing image completion on the original image with the mask image to generate an original image after eliminating the text feature.

According to another aspect of the present disclosure, a text matting apparatus based on a neural network is provided. The apparatus includes: a feature extracting unit, configured to process a first image with a feature extraction network to obtain feature maps, wherein the feature extraction network comprises sequentially connected n extraction convolutional network blocks, and wherein a 1-st extraction convolutional network block processes the first image and outputs a 1-st feature map, and an i-th extraction convolutional network block processes an (i−1)-th feature map and outputs an i-th feature map; an intermediate processing unit, configured to process the feature maps with an intermediate processing network to obtain intermediate feature maps, wherein the intermediate processing network comprises n spatial convolutional network blocks, a 1-st spatial convolutional network block processes the 1-st feature map and outputs a 1-st intermediate feature map, and an i-th spatial convolutional network block processes the i-th feature map and outputs an i-th intermediate feature map; and a feature fusing unit, configured to process the intermediate feature maps with a feature fusion network to obtain a second image, wherein, the feature fusion network comprises sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n−i+1)-th intermediate feature map output by an (n−i+1)-th spatial convolutional network block and an (i−1)-th fusion map output by an (i−1)-th fusion convolutional network block to obtain an i-th fusion map, wherein an n-th fusion map output by an n-th fusion convolutional network block serves as the second image; and the second image comprises a text feature extracted from the first image, and wherein n is an integer greater than 1, and i is an integer greater than 1 but less than or equal to n.

According to yet another aspect of the present disclosure, an image processing device is provided, which includes: a processor; and a memory with computer-readable codes stored thereon, wherein the computer-readable codes, upon executed by the processor, perform the text matting method as described above.

According to yet another aspect of the present disclosure, a non-transitory computer-readable storage medium with instructions stored thereon is provided, wherein the instructions upon execution by a processor, cause the processor to perform the text matting method as described above.

By using the text matting method and apparatus based on the neural network, the device, and the storage medium according to the embodiments of the present disclosure, the neural network composed of a feature extraction network, an intermediate processing network and a feature fusion network can be used to perform text matting on a first image including text information, to extract a text feature in the first image, and obtain a second image including the text feature; and the second image preserves personalized information such as font and color of the text, which is profit to expand application field and scope of the text feature. In addition, the intermediate processing network may serve as a connection layer between the feature extraction network and the feature fusion network to extract multi-scale intermediate features and improve accuracy of text feature extraction.

BRIEF DESCRIPTION OF THE DRAWINGS

In order to clearly illustrate the technical solution of the embodiments of the present disclosure or in the prior art, the drawings that need to be used in description of the embodiments or the prior art will be briefly described in the following. It is obvious that the described drawings are only related to some embodiments of the present disclosure; based on the drawings, those ordinarily skilled in the art can acquire other drawings, without any inventive work.

FIG. 1 shows a schematic flow chart of a text matting method based on a neural network according to embodiments of the present disclosure;

DETAILED DESCRIPTION

Figure 2:
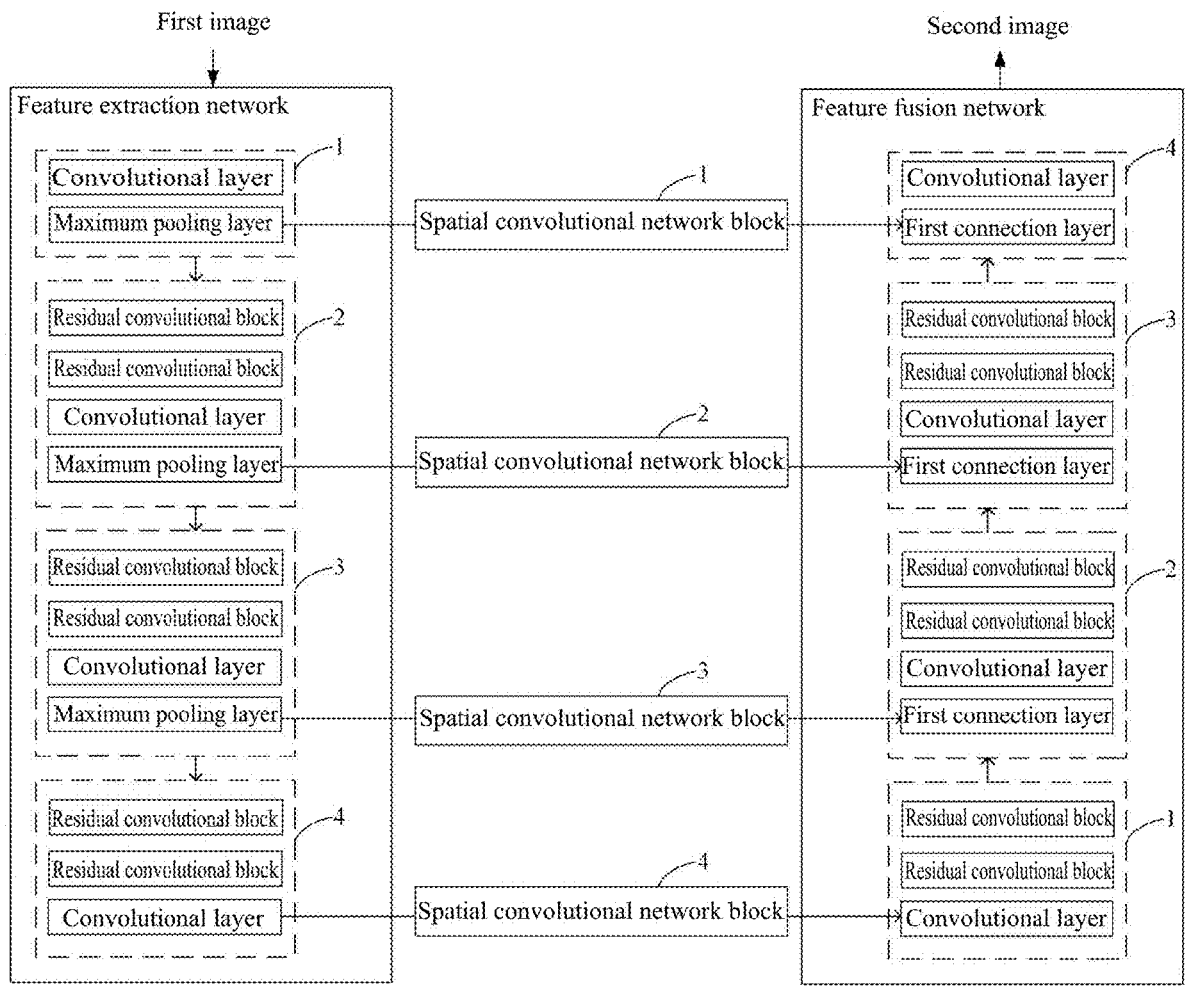
FIG. 2 shows a schematic structural diagram of a neural network for implementing text matting according to embodiments of the present disclosure.

The following will provide a clear and complete description of the technical solution in the disclosed embodiment in conjunction with the accompanying drawings. Obviously, the described embodiments are only a portion of the embodiments disclosed in this disclosure, and not all of them. Based on the embodiments in this disclosure, all other embodiments obtained by ordinary technical personnel in the art without the need for creative labor belong to the scope of protection in this disclosure.

The terms "first", "second", and similar terms used in this disclosure do not indicate any order, quantity, or importance, but are only used to distinguish different components. Similarly, words such as "including" or "comprising" refer to the components or objects that appear before the word, including the components or objects listed after the word and their equivalents, without excluding other components or objects. Words such as "connection" or "link" are not limited to physical or mechanical connections, but can include electrical connections, whether direct or indirect.

A flowchart is used in this disclosure to illustrate the steps of the method according to the disclosed embodiment. It should be understood that the steps before or after may not be carried out precisely in order. On the contrary, various steps can be processed in reverse order or simultaneously. At the same time, other operations can also be added to these processes.

It can be understood that the professional terms and expressions involved herein have meanings well-known to those skilled in the art.

Character recognition technology may detect and recognize text information in an image, for example, information such as position and content of a text; for example, the extracted character may be used for applications such as semantic recognition. However, character content extraction is incapable of preserving personalized features such as artistic fonts, text styles, etc. that have unique design in images such as posters and advertisements.

With development of artificial intelligence, it is widely used in the image processing field. Artificial Intelligence (AI) technology is a theory, a method, a technology, and an application system that utilizes digital computers or digital computer-controlled machines to simulate, extend, and expand human intelligence, perceive environment, acquire knowledge, and use knowledge to obtain best results. In other words, artificial intelligence is a comprehensive technology in computer science, it attempts to understand the essence of intelligence and produce a new intelligent machine that can respond in a way similar to that of human intelligence. Artificial intelligence is study of design principles and implementations of various intelligent machines, such that the machines have functions of perception, reasoning, and decision-making.

Artificial intelligence technology is a comprehensive discipline that involves a wide range of fields, including both hardware and software level technologies, mainly including computer vision technology, speech processing technology, natural language processing technology, and machine learning/deep learning. By training a neural network based on training samples, for example, image processing tasks such as image feature extraction and segmentation may be implemented.

Embodiments of the present disclosure provide a text matting method and apparatus based on a neural network, a device, and a storage medium; by constructing a neural network architecture capable of implementing text matting tasks, an input image including a text is processed and an output image having a text feature is output, so as to implement text matting. The output image includes a complete text feature which preserves personalized information such as font and color of the text, thus, it may be flexibly applied to application fields such as creative font extraction and subtitle elimination.

Specifically, in the text matting method and apparatus based on the neural network, the device, and the storage medium according to embodiments of the present disclosure, the neural network composed of a feature extraction network, an intermediate processing network, and a feature fusion network is used to perform text matting on a first image including text information, to extract a text feature in the input image, and obtain an output image including the text feature, and the output image preserves personalized information such as font and color of the text, which is favorable for expanding application field and scope of the text feature. In addition, the intermediate processing network may serve as a connection layer between the feature extraction network and the feature fusion network, to extract multi-scale intermediate features, thereby improving accuracy of text feature extraction.

FIG. 1 shows a schematic flow chart of a text matting method based on a neural network according to embodiments of the present disclosure. Next, an overall implementation flow of the text matting method according to the embodiments of the present disclosure will be described in conjunction with FIG. 1, followed by detailed description of a structure of the neural network implementing the text matting method.

Firstly, as shown in FIG. 1, in step S101, a feature extraction network is used to process a first image to obtain feature maps, wherein, the feature extraction network includes sequentially connected n extraction convolutional network blocks, wherein, a 1-st extraction convolutional network block processes the first image and outputs a 1-st feature map, and an i-th extraction convolutional network block processes an (i−1)-th feature map and outputs an i-th feature map, where, n is an integer greater than 1, and i is an integer greater than 1 but less than or equal to n.

According to some embodiments of the present disclosure, the respective extraction convolutional network blocks may be the same or different in network structure design and specific parameters, which may be set according to factors such as specific application scenarios and size of the first image. In addition, a value of n may also be set according to factors such as specific application scenarios and size of the first image. It may be understood that although some parameters or values are described for specific examples or application scenarios in description hereinafter, the implementation according to the embodiments of the present disclosure are not limited thereto.

According to some embodiments of the present disclosure, the feature extraction network is used for performing feature extraction on the input first image, for example, sequentially connected n extraction convolutional network blocks included therein are used for extracting feature information of different scales. According to some embodiments of the present disclosure, the n extraction convolutional network blocks in the feature extraction network may be each composed of one or more of a convolutional layer, a pooling layer, and a residual convolutional block; a specific network implementation will be described in conjunction with FIG. 3 below. In general, in the feature extraction network, the convolutional layer is used for feature extraction, and the pooling layer is used for reducing a spatial size of an image feature extracted by the convolutional layer, and providing a larger perception range. According to some embodiments of the present disclosure, the residual convolutional block may be composed of a convolutional layer, a batch normalization layer, and an activation function. A structure of the residual convolutional block will be described in conjunction with FIG. 4 below.

Next, in step S102, an intermediate processing network is used to process the feature maps to obtain intermediate feature maps. The intermediate processing network includes n spatial convolutional network blocks, wherein, a 1-st spatial convolutional network block processes a 1-st feature map and outputs a 1-st intermediate feature map, and an i-th spatial convolutional network block processes an i-th feature map and outputs an i-th intermediate feature map. Similarly, according to some embodiments of the present disclosure, the respective spatial convolutional network blocks may be the same or different in network structure design and specific parameters, which may be set according to factors such as specific application scenarios and size of the first image. In some implementations, the respective spatial convolutional network blocks are the same in network structures and network parameters.

According to some embodiments of the present disclosure, the intermediate processing network serves as a connection layer between the feature extraction network and the feature fusion network, and is used for further extracting a multi-scale intermediate feature, and outputting extracted intermediate feature maps at different scales to a corresponding block of the feature fusion network, to improve accuracy and completeness of the text feature in the output image. For example, the intermediate processing network includes n spatial convolutional network blocks for respectively processing feature maps of different sizes output by n extraction convolutional network blocks in the feature extraction network, in order to further obtain the intermediate feature maps.

Next, referring to FIG. 1, in step S103, the feature fusion network is used to process the intermediate feature map to obtain a second image, wherein, the feature fusion network includes sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n−i+1)-th intermediate feature map output by an (n−i+1)-th spatial convolutional network block and an (i−1)-th fusion map output by an (i−1)-th fusion convolutional network block to obtain an i-th fusion map. According to some embodiments of the present disclosure, an n-th fusion map output by an n-th fusion convolutional network block serves as the second image; and the second image includes a text feature extracted from the first image. Similarly, according to some embodiments of the present disclosure, the respective fusion convolutional network blocks may be the same or different in network structure design and specific parameters, which may be set according to factors such as specific application scenarios and size of the first image. A specific network implementation will be described in conjunction with FIG. 3 below.

According to some embodiments of the present disclosure, the feature fusion network is used to perform feature fusion on the intermediate feature maps output by the intermediate processing network, in order to output a final output image, that is, the second image; and the second image may have a same image size as the first image. Specifically, the second image includes a text feature extracted from the first image; and the text feature not only includes character information but also includes personalized design features such as text fonts.

According to some embodiments of the present disclosure, the n fusion convolutional network blocks in the feature fusion network may be each composed of one or more of a convolutional layer, a residual convolutional block, and a first connection layer, wherein, the first connection layer includes a feature merging layer and a super-resolution layer. According to some embodiments of the present disclosure, the feature merging layer is used for merging a plurality of input images by increasing the number of image channels; and the super-resolution layer is used for increasing image size by reducing the number of image channels. According to some embodiments of the present disclosure, the residual convolutional block may be composed of a convolutional layer, a batch normalization layer, and an activation function. In the feature fusion network, the first connection layer may be used for performing feature connection on the intermediate feature map output by the spatial convolutional network block and the fusion map output by the fusion convolutional network block at an upper level, so as to process the two together.

As an example, in a case of n=4, that is, the feature extraction network includes sequentially connected 4 extraction convolutional network blocks, a 1-st extraction convolutional network block processes the first image (i.e. the image input to the feature extraction network) and outputs a 1-st feature map, a 2-nd extraction convolutional network block processes the 1-st feature map and outputs a 2-nd feature map, a 3-rd extraction convolutional network block processes the 2-nd feature map and outputs a 3-rd feature map, and a 4-th extraction convolutional network block processes the 3-rd feature map and outputs a 4-th feature map.

As an example, in a case of n=4, that is, the intermediate processing network includes 4 spatial convolutional network blocks, a 1-st spatial convolutional network block is used for processing a 1-st feature map output by a 1-st extraction convolutional network block and output a 1-st intermediate feature map, a 2-nd spatial convolutional network block is used for processing a 2-nd feature map output by a 2-nd extraction convolutional network block and output a 2-nd intermediate feature map, a 3-rd spatial convolutional network block is used for processing a 3-rd feature map output by a 3-rd extraction convolutional network block and output a 3-rd intermediate feature map, and a 4-th spatial convolutional network block is used for processing a 4-th feature map output by a 4-th extraction convolutional network block and output a 4-th intermediate feature map. A network implementation of the intermediate processing network and the spatial convolutional network block therein will be described in conjunction with FIG. 5 below.

As an example, in a case of n=4, that is, the feature fusion network includes sequentially connected 4 fusion convolutional network blocks, a 1-st fusion convolutional network block processes a 4-th intermediate feature map output by a 4-th spatial convolutional network block to obtain a 1-st fusion map; a 2-nd fusion convolutional network block processes a 3-rd intermediate feature map output by a 3-rd spatial convolutional network block and a 1-st fusion map output by a 1-st fusion convolutional network block to obtain a 2-nd fusion map; a 3-rd fusion convolutional network block processes a 2-nd intermediate feature map output by a 2-nd spatial convolutional network block and a 2-nd fusion map output by a 2-nd fusion convolutional network block to obtain a 3-rd fusion map; and, a 4-th fusion convolutional network block processes a 1-st intermediate feature map output by a 1-st spatial convolutional network block and a 3-rd fusion map output by a 3-rd fusion convolutional network block to obtain a 4-th fusion map.

Specifically, FIG. 2 shows a structural schematic diagram of 4 extraction convolutional network blocks and 4 fusion convolutional network blocks in a specific example of n=4. It may be understood that the specific structures of the feature extraction network and the feature fusion network according to the embodiment of the present disclosure are not limited thereto.

As shown in FIG. 2, in the feature extraction network, the 1-st extraction convolutional network block is composed of a convolutional layer and a maximum pooling layer, the 2-nd extraction convolutional network block is composed of a residual convolutional block, a convolutional layer and a maximum pooling layer, the 3-rd extraction convolutional network block is composed of a residual convolutional block, a convolutional layer and a maximum pooling layer, and the 4-th extraction convolutional network block is composed of a residual convolutional block and a convolutional layer. For example, the residual convolutional block may be composed of a convolutional layer, a batch normalization layer and an activation function.

Next, as shown in FIG. 2, in the feature fusion network, the 1-st fusion convolutional network block is composed of a convolutional layer and a residual convolutional block; the 2-nd fusion convolutional network block is composed of a first connection layer, a convolutional layer and a residual convolutional block; the 3-rd fusion convolutional network block is composed of a first connection layer, a convolutional layer and a residual convolutional block; and the 4-th fusion convolutional network block is composed of a first connection layer and a convolutional layer, wherein, the first connection layer may include, for example, a feature merging layer and a super-resolution layer. Similarly, the feature merging layer is used for merging a plurality of (e.g., 2) input images by increasing the number of image channels; the super-resolution layer is used for increasing an image size by reducing the number of image channels; and the residual convolutional block therein may be composed of a convolutional layer, a batch normalization layer and an activation function. According to the embodiments of the present disclosure, in the example of FIG. 2, the 4-th fusion map output by the 4-th fusion convolutional network block serves as the second image; the second image may have a same image size as the first image; and the second image includes a text feature extracted from the first image.

According to some embodiments of the present disclosure, referring to FIG. 2, in the feature fusion network, the last layer has the convolutional layer directly output an image whose pixel values have constrained distribution in an interval of 0 to 1, of which an objective is to make the extracted text contour transition natural and to preserve special forms such as gradient or translucency of the original text, that is to say, pixel points of the 4-th fusion map are represented as text probability values located in the interval of 0 to 1, and are output as a grayscale image in an interval of 0 to 255 after quantization. The second image output by using the text matting method according to the embodiment of the present disclosure is a grayscale image whose color scales are located in an interval of 0 to 255, which may reflect characteristics of a matting task by using the neural network: the final output reflects the probability values, a probability value is closer to 0 for a region closer to black, and a probability value is closer to 1 for a region closer to white; and finally, it is output as a grayscale image with 256 color scales after quantization, that is, the text obtained by matting has natural contour transition and supports special forms such as gradient or translucency of the original text, so that the output second image may serve as a mask image including a personalized text feature, which is favorable for further applying the mask image obtained through text matting to specific application scenarios such as video subtitle elimination, which will be described below. Comparatively, in a scenario where the neural network is used in an image segmentation task, each pixel in the input image is subjected to, for example, binary classification, that is, an output value is either 0 or 1, which is different from the text matting solution involved in the present disclosure.

Next, specific implementations of the feature extraction network, the intermediate processing network, and the feature fusion network according to the embodiments of the present disclosure will be described in conjunction with FIG. 3, FIG. 4 and FIG. 5, and specific parameter values will be given through examples.

Figure 3:
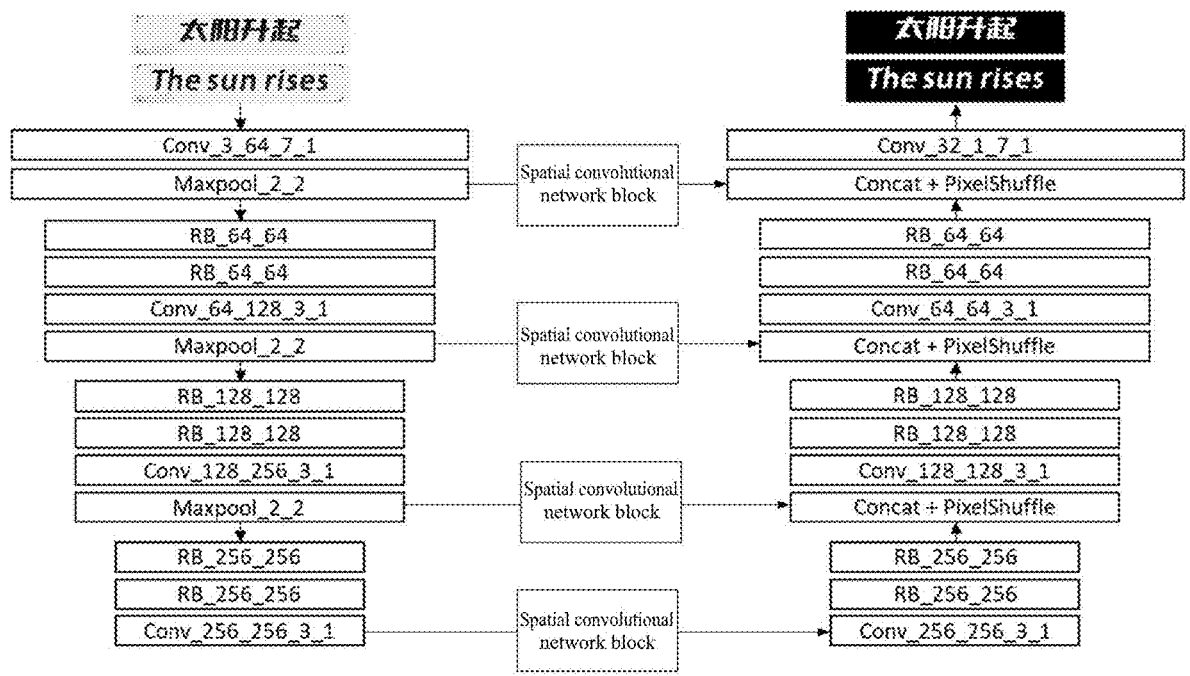
FIG. 3 shows an overall structural diagram of the neural network for implementing text matting according to embodiments of the present disclosure.

FIG. 3 shows an overall structural diagram of the neural network for implementing text matting according to the embodiment of the present disclosure. As shown in FIG. 3, firstly, the first image including text information may be input to the feature extraction network, that is, input to the 1-st extraction convolutional network block in the feature extraction network. Referring to FIG. 3, the first image includes a text feature and a background, the text feature specifically includes text characters "太阳升起" and "The Sun Rises", text fonts (a Chinese font and an English font), and text color; specifically, the text color herein may refer to contents such as solid colors, textures, and patterns. In the grayscale picture shown in FIG. 3, the text color is grayscale information included in the characters per se; and it may be understood that various text colors, etc. may be processed by using the text matting method according to the embodiment of the present disclosure. In addition, in the example in FIG. 3, a single text resolution may be uniformly scaled to 150*150 pixels for ease of processing.

A design target of the neural network shown in FIG. 3 is to extract the text feature in the first image, that is, to implement text matting, not only extracting text characters but also including the above-described personalized features such as text font, text color and text position; and the example of the second image output in FIG. 3 may be referred to for a specific text matting effect. As described above, the second image is a grayscale image whose pixel values are located in an interval of 0 to 255, which makes the extracted text contour transition natural and preserves special forms such as gradient or translucency of the original text. In addition, according to some embodiments of the present disclosure, the output second image may have a same picture size as the first image, which is favorable for reflecting position information of the text in the original input image.

As shown in FIG. 3, the feature extraction network includes 4 extraction convolutional network blocks, wherein, a 1-st extraction convolutional network block processes the first image and outputs a 1-st feature map; and the 1-st feature map is not only output down to a 2-nd extraction convolutional network block but also output to the spatial convolutional network block for extracting a 1-s/intermediate feature map.

Specifically, the 1-st extraction convolutional network block includes a convolutional layer and a maximum pooling layer. For ease of description, herein parameters of the convolutional layer are represented as Conv_c1_c2_k_s_d_g, and parameters of the maximum pooling layer are represented as Maxpool_k_s, where, c1 represents the number of input channels, c2 represents the number of output channels, k represents a size of a filtering kernel, s represents a step size, d represents a spatial convolutional expansion coefficient (default as 1), and g represents a separation convolution group coefficient (default as 1). Therefore, a convolutional layer Conv_3_64_7_1 in the 1-st extraction convolutional network block shown in FIG. 3 may be understood as a convolution function having the number of input channels of 3, the number of output channels of 64, a filtering kernel size of 7, and a step size of 1; and the spatial convolutional expansion coefficient and a separation convolution group coefficient are a default value 1. Next, a maximum pooling layer Maxpool_2_2 in the 1-st extraction convolutional network block may be understood as a maximum pooling function having a filtering kernel size of 2 and a step size of 2.

Next, as shown in FIG. 3, in the feature extraction network, a 2-nd extraction convolutional network block processes the 1-st feature map and outputs a 2-nd feature map; the 2-nd feature map is not only output down to a 3-rd extraction convolutional network block but also output to the spatial convolutional network block for extracting a 2-nd intermediate feature map. Specifically, the 2-nd extraction convolutional network block includes a residual convolutional block, a convolutional layer and a maximum pooling layer; the parameter meanings above may be referred to for parameters of the convolutional layer and the maximum pooling layer, and no details will be repeated here.

Figure 4:
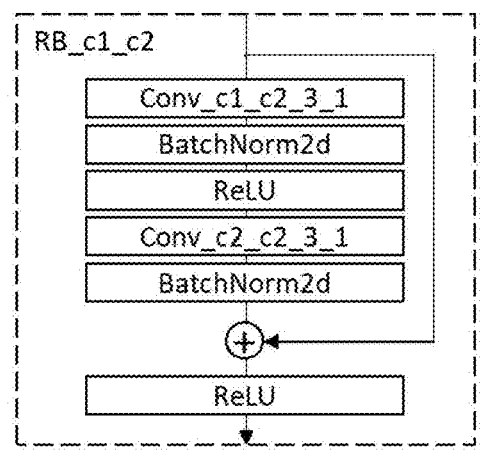
FIG. 4 shows a network structural diagram of a residual convolutional block according to embodiments of the present disclosure.

FIG. 4 shows a network structural diagram of a residual convolutional block according to an embodiment of the present disclosure; wherein, similarly, for ease of description, parameters of the residual convolutional block (Resnet Block, RB) are represented as RB_c1_c2, where, c1 represents the number of input channels and c2 represents the number of output channels; further, referring to FIG. 4, the residual convolutional block is composed of a convolutional layer, a batch normalization layer (BatchNorm2d), and an activation function (ReLU); it may be understood that the residual convolutional block includes two processing paths, one of which is the above-described processing path that includes the convolutional layer, the batch normalization layer (BatchNorm2d), and the activation function (ReLU), the other is used for implementing cross-level connection and add the two together. The residual network differs from an ordinary network in that a skip connection of the above-described across-level connection is introduced, which allows information from a previous residual block to enter a next processing layer without obstruction, improves information flow, and also avoids a vanishing gradient problem and a degradation problem caused by network depth increase.

Next, as shown in FIG. 3, in the feature extraction network, a 3-rd extraction convolutional network block processes the 2-nd feature map and outputs a 3-rd feature map, the 3-rd feature map is not only output down to a 4-th extraction convolutional network block but also output to the spatial convolutional network block for extracting a 3-rd intermediate feature map. Specifically, the 3-rd extraction convolutional network block includes a residual convolutional block, a convolutional layer and a maximum pooling layer; the above parameter meanings may be referred to for parameters of the convolutional layer and the maximum pooling layer, and no details will be repeated here. Referring to FIG. 3, the 3-rd extraction convolutional network block and the 2-nd extraction convolutional network block only differ in the parameters of the convolutional layer. As shown in FIG. 3, a 4-th extraction convolutional network block processes the 3-rd feature map and outputs a 4-th feature map, and the 4-th feature map will be output to the spatial convolutional network block for extracting a 4-th intermediate feature map. Specifically, the 4-th extraction convolutional network block includes a residual convolutional block and a convolutional layer.

FIG. 3 also schematically shows a network structural diagram of the feature fusion network. The feature fusion network includes 4 fusion convolutional network blocks, wherein, a 1-st fusion convolutional network block processes the 4-th intermediate feature map output by the 4-th spatial convolutional network block to obtain a 1-st fusion map. Specifically, the 1-st fusion convolutional network block is composed of a convolutional layer and a residual convolutional block. A 2-nd fusion convolutional network block processes the 3-rd intermediate feature map output by the 3-rd spatial convolutional network block and the 1-st fusion map output by the 1-st fusion convolutional network block to obtain a 2-nd fusion map. Specifically, the 2-nd fusion convolutional network block is composed of a first connection layer, a convolutional layer and a residual convolutional block. Referring to FIG. 3, the first connection layer includes a feature merging layer and a super-resolution layer; the feature merging layer is used for merging a plurality of input images by increasing the number of image channels; and the super-resolution layer is used for increasing the image size by reducing the number of image channels.

As an implementation, in FIG. 3, the feature merging layer adopts a merge function (Concat), which may be used for integrating two or more groups of input feature maps and increasing the number of channels of the output feature maps. For example, if the numbers of channels in the two input feature maps are respectively x and y, the number of channels of the feature maps merged through Concat may be x+y. Next, the merged feature maps will be output to the super-resolution layer. In the implementation shown in FIG. 3, the super-resolution layer is implemented as a PixelShuffle function; as compared with a general upsampling function, the PixelShuffle combines channel dimension information to fill pixels, which may improve resolution and generate a more realistic image. The PixelShuffle here may be understood as transforming an H×W low-resolution image into an rH×rW high-resolution image through subpixel operation; however, the process of the PixelShuffle implementing resolution improvement is not directly generated in modes such as interpolation, but the high-resolution image is obtained through periodic shuffling. For example, before undergoing PixelShuffle, the number of feature layers is 256; and after undergoing PixelShuffle, an output image with 64 feature layers but improved image resolution may be obtained.

Referring to FIG. 3, a 3-rd fusion convolutional network block processes the 2-nd intermediate feature map output by the 2-nd spatial convolutional network block and the 2-nd fusion map output by the 2-nd fusion convolutional network block to obtain a 3-rd fusion map. The 3-rd fusion convolutional network block is composed of a first connection layer, a convolutional layer and a residual convolutional block. A 4-th fusion convolutional network block processes the 1-st intermediate feature map output by the 1-st spatial convolutional network block and the 3-rd fusion map output by the 3-rd fusion convolutional network block to obtain a 4-th fusion map. The 4-th fusion convolutional network block is composed of a first connection layer and a convolutional layer. According to some embodiments of the present disclosure, the 4-th fusion map output by the 4-th fusion convolutional network block will be output as a second image. Specifically, the second image includes the text feature extracted from the first image.

As shown in FIG. 3, the output second image is a grayscale image whose values are located in an interval of 0 to 255; a region with a grayscale close to black represents a background portion in the first image except for the text, and a region with a grayscale close to white represents the text feature extracted from the first image, that is, text matting is implemented. The image obtained through text matting not only includes text characters, but also include features such as text font, text color, etc.

According to the embodiment of the present disclosure, the respective spatial convolutional network blocks in the intermediate processing network may be designed to have a same network structure and parameters. Each spatial convolutional network block includes m parallel processing units and a second connection layer. The m processing units are used for respectively processing an input image (e.g., a feature map output by the feature extraction network), while the second connection layer is used for merging processing results of the m processing units, wherein, the second connection layer includes a feature merging layer, a convolutional layer, and a batch normalization layer, wherein, the feature merging layer is used for merging m images respectively output by the m processing units through increasing the number of image channels, where, m is an integer greater than 1.

Figure 5:
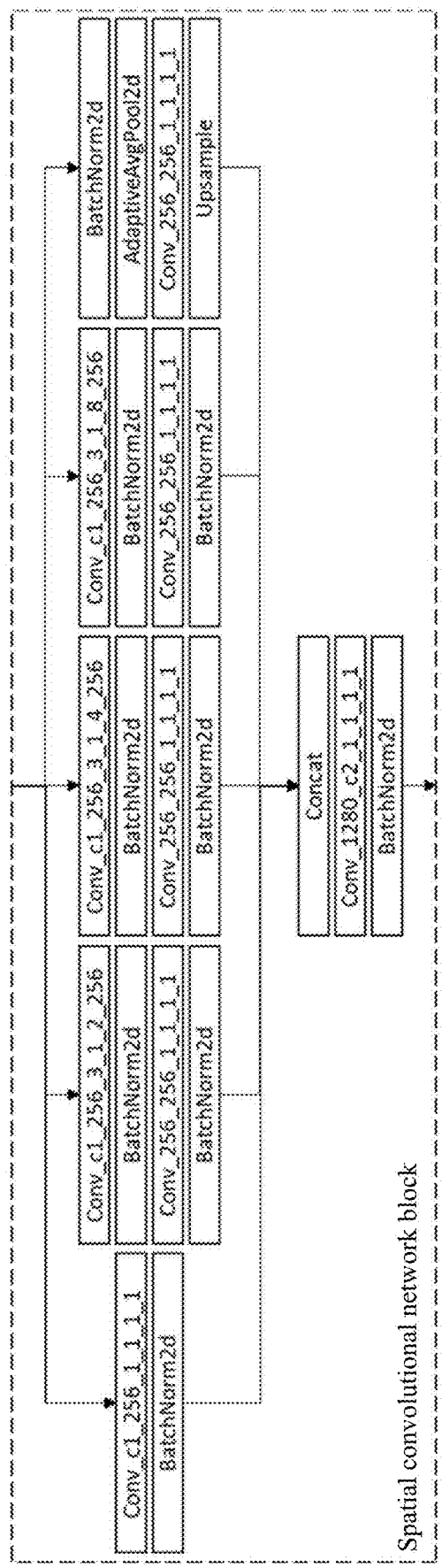
FIG. 5 shows a network structural diagram of a spatial convolutional network block according to embodiments of the present disclosure.

FIG. 5 shows a network structural diagram of a spatial convolutional network block according to an embodiment of the present disclosure; and in the example of FIG. 5, m=5. As an implementation, in a case of m=5, in each spatial convolutional network block, a 1-st processing unit is composed of a first convolutional layer and a batch normalization layer sequentially connected; a 2-nd processing unit is composed of a second convolutional layer, a batch normalization layer, a third convolutional layer and a batch normalization layer sequentially connected; a 3-rd processing unit is composed of a fourth convolutional layer, a batch normalization layer, a third convolutional layer and a batch normalization layer sequentially connected; a 4-th processing unit is composed of a fifth convolutional layer, a batch normalization layer, a third convolutional layer and a batch normalization layer sequentially connected; a fifth processing unit is composed of a batch normalization layer, an adaptive average pooling layer, a third convolutional layer and an upsampling layer sequentially connected; wherein, the first convolutional layer, the second convolutional layer, the third convolutional layer, the fourth convolutional layer, and the fifth convolutional layer have different network parameters.

Therefore, in the example of FIG. 5, the input feature map is firstly processed respectively by the 5 parallel processing units. As compared with the feature extraction network, the spatial convolutional network block is used for further extracting multi-scale feature information, which may be implemented by using convolutional layers having different spatial convolutional expansion coefficients (d). In the example in FIG. 5, the spatial convolutional expansion coefficients are respectively designed as 1, 2, 4, 8 and full. As shown in FIG. 5, the 5 processing units respectively include convolutional layers whose spatial convolutional expansion coefficients are respectively 1, 2, 4, 8 and full, where, full corresponds to an adaptive average pooling layer (AdaptiveAvgPool2d) included in the 5-th processing unit in FIG. 5; and the layer is used for calculating a global average value and statistical horizontal feature distribution. With respect to selection of the above spatial convolutional expansion coefficients, in the text matting implementation shown in FIG. 3, in addition to segmenting the outer contours of the text, local fine matting is also required for the interior of the text; and considering that the single-text resolution in the input image is uniformly scaled to 150*150, the spatial convolutional expansion coefficients are set to smaller values.

Referring to FIG. 5, the second connection layer includes a feature merging layer (Concat), a convolutional layer (Conv_1280_c2_1_1_1_1), and a batch normalization layer (BatchNorm2d). Similarly, the feature merging layer Concat is used for merging the 5 processing results obtained from the above parallel processing, to obtain a merged feature map; and after undergoing processing by the convolutional layer and the batch normalization layer, the intermediate feature map is output to a corresponding fusion convolutional network block in the feature fusion network.

The text matting method according to some embodiments of the present disclosure may further include a training process for the neural network. Before using the neural network structure shown in FIG. 3 for the text matting processing task, it is also necessary to train network parameters of the neural network by using a training image set. Specifically, the training process includes: generating a training image set and annotating training images in the training image set to generate a corresponding mask image; and using the training image set and training the feature extraction network, the intermediate processing network and the feature fusion network based on a training function.

Specifically, the above process of annotating the generated training images may be understood as annotating true values as a target of the training task.

According to some embodiments of the present disclosure, the generating a training image set includes: constructing a corpus composed of text characters, a font database composed of text fonts, a texture feature database composed of text colors, and a background database composed of background pictures; and randomly selecting a group of text characters, text fonts, text colors, and background pictures from the corpus, the font database, the texture feature database, and the background database, and forming training images.

Figure 6:
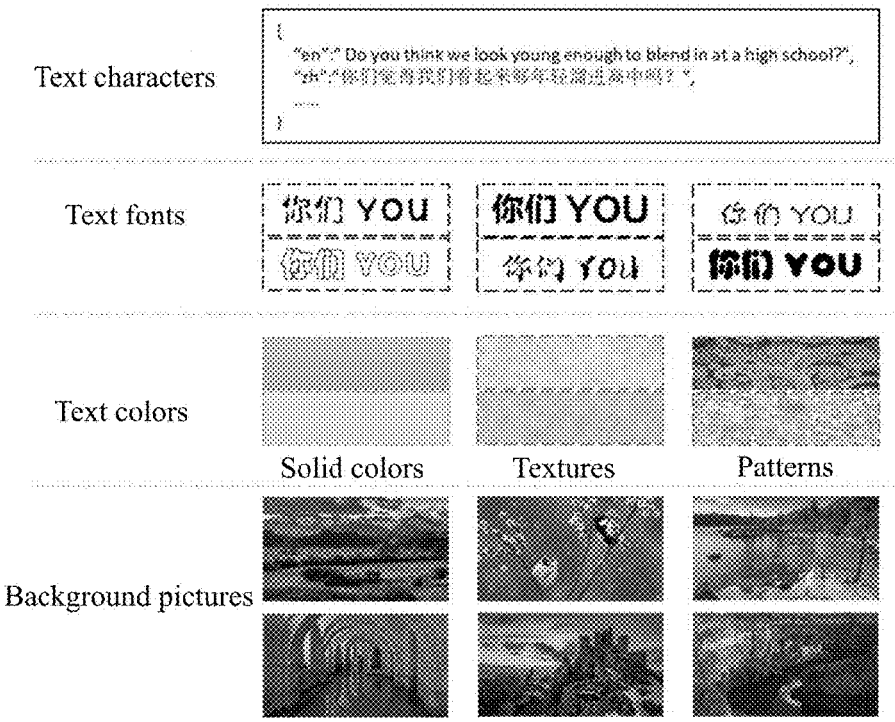
FIG. 6 shows a schematic diagram of data elements used for generating a dataset according to embodiments of the present disclosure.

According to the embodiment of the present disclosure, there is provided a dataset creation method for the text matting training task, wherein, the dataset for the text matting task mainly includes four elements: text character, text font, text color, and background picture. FIG. 6 shows a schematic diagram of a data element used for creating a dataset according to an embodiment of the present disclosure. As shown in FIG. 6, text characters may include both Chinese characters and English characters, text fonts may include both Chinese fonts and English fonts, and text colors may include solid colors, textures, and patterns, etc. According to examples of respective elements shown in FIG. 6, a corpus composed of text characters, a font database composed of text fonts, a texture feature database composed of text colors, and a background database composed of background pictures may be constructed. As an example, a corpus may be a Chinese-English machine translation corpus, which includes approximately 10 million pairs of Chinese-English sentences as text character data. Text fonts may be obtained from commonly used font database, for example, about 100 Chinese fonts and about 500 English fonts. With respect to the texture feature database, solid color images may be randomly generated through an image processing function, etc. Background images may be obtained from commonly used image processing databases.

Figure 7:
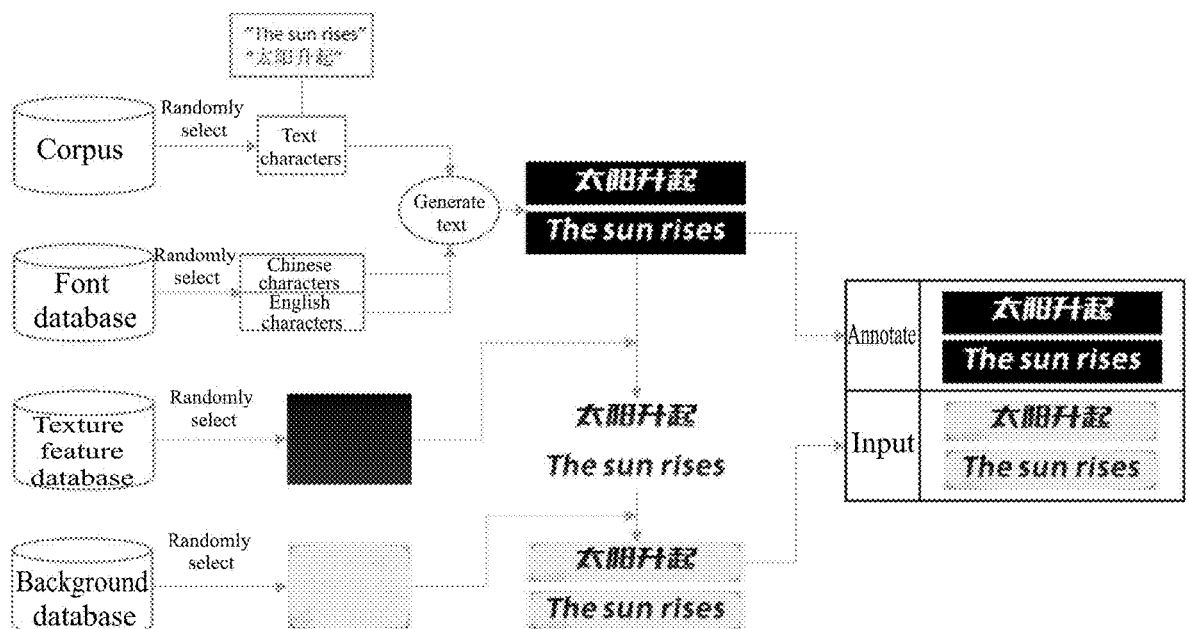
FIG. 7 shows a schematic flow chart of generating the dataset according to embodiments of the present disclosure.

FIG. 7 shows a schematic flow chart of creating a dataset according to an embodiment of the present disclosure. According to some embodiments of the present disclosure, in order to acquire as much training image data as possible, fit a greater amount of more complex text contents and formats, a group of data may be randomly extracted from the database shown in FIG. 6 during each iteration of the neural network model training process, and then the training image may be created and a corresponding mask image may be annotated. Specifically, as shown in FIG. 7, with respect to text characters extracted from the corpus as well as Chinese fonts and English fonts extracted from the font database, a text image may be generated firstly, and the text image may be annotated as a mask image for training. Next, the generated text image may be processed based on the extracted text color to obtain a text feature having a font color. Further, the generated text feature having a color is inserted into the extracted background picture as a training image for training. The process of the neural network processing the training image is similar to the process of processing the first image as described above, and no details will be repeated here.

As an example, after inputting one of the training images in the training dataset into the neural network, a training output image corresponding to the training image will be generated. With respect to the training output image, a loss value between the training output image and the annotated mask image (i.e., as a true value or referred to as a target value) may be calculated according to the training function. A large number of training images in the training dataset are used to continuously reduce the loss value as the training target, so that the neural network shown in FIG. 3 has a text matting processing capability that meets training requirements.

According to some embodiments of the present disclosure, the training function may include an Alpha loss function for calculating a difference in pixel-by-pixel absolute values between an annotated mask image ($a_g$) and a training output image ($a_p$) output by the neural network based on the training image. The loss value calculated based on the Alpha loss function is represented as an Alpha loss value. As an example, a calculation formula of the Alpha loss function is as follows:

$$L_\alpha = \frac{1}{H \times W} \sum_{w=0}^{W} \sum_{h=0}^{H} \sqrt{(\alpha_p - \alpha_g)^2 + \epsilon^2}, \alpha_p, \alpha_g \in [0, 1], \epsilon = 10^{-8} \quad (1)$$

According to some embodiments of the present disclosure, the training function may include a Laplacian loss function for decomposing the training output image ($a_p$) into a 5-level Gaussian pyramid, then calculating the Alpha loss value between the decomposed training output image ($a_p$) and a corresponding mask image ($a_g$) on respective levels, and finally weighting and combining to obtain the Laplacian loss value. As an example, a calculation formula of the Laplacian loss function is as follows:

$$L_{lap} = \sum_{b=1}^{5} 2^{b-1} \left\| L_{pry}^b(\alpha_g) - L_{pry}^b(\alpha_p) \right\|_1 \quad (2)$$

Where, $L_{pry}^b(a)$ represents a level of the pyramid, where, b ranges from 1 to 5.

According to some embodiments of the present disclosure, the training function may include a Holistically-nested Edge Detection (HED) loss function, wherein, a Hed edge detection network is used to respectively extract an edge map of the training output image ($a_p$) and an edge map of the mask image ($a_g$), and calculate L1 norm between the edge map of the mask image ($a_g$) and the edge map of the training output image ($a_p$) output by the network; and the loss value calculated based on the HED loss function is represented as an HED loss value. As an example, a calculation formula of the HED loss function is as follows:

$$L_{hed\_edge} = \frac{1}{5} \sum_{j=1}^{5} \|H_j(\alpha_g) - H_j(\alpha_p)\|_1 \quad (3)$$

Where, $H_j(a)$ represents an edge image of a j-th layer extracted by the HED edge detection network, where, j ranges from 1 to 5.

According to some embodiments of the present disclosure, the training function may include one or more of the Alpha loss function, the Laplacian loss function, and the HED loss function as described above. In a case where the training function includes the above three, a complete loss value calculation formula is as follows:

$$L = L_\alpha + L_{cap} + 0.5 \times L_{hed\_edge} \quad (4)$$

Where, the Alpha loss value, the Laplacian loss value and the HED loss value are respectively multiplied by weight coefficients of 1, 1 and 0.5.

As an example, during the training process of the neural network, relevant training parameters may be set as follows:

| Optimizer | Adaptive Moment Estimation (Adam) |
|---|---|
| Initial learning rate | 10 to 4 |
| Text character scaling size | 150*150 |
| Batch Size | 48 |
| The total number of iterations, | 1*106 |

By using the text matting method based on the neural network according to some embodiments of the present disclosure, the neural network composed of the feature extraction network, the intermediate processing network, the feature fusion network may be used to perform text matting on the first image including text information, to extract the text feature from the first image, and obtain the second image including the text feature; and the output second image preserves personalized information such as font and color of the text. In addition, the intermediate processing network may serve as the connection layer between the feature extraction network and the feature fusion network, to extract multi-scale intermediate features, thereby improving accuracy of text feature extraction.

Further, the second image obtained by using the above text matting method (which may be represented as a text feature image or a text mask) may also expand an application field of the personalized text feature.

The text matting method according to some embodiments of the present disclosure may further include: performing text detection on an original image, for extracting a detection image including text from the original image, wherein, the detection image serves as the first image. That is to say, with respect to the original image, image preprocessing may be performed firstly to extract therein a detection image including text; and a size of the detection image may be smaller than the original image to reduce the amount of data for image processing.

Further, the text matting method according to some embodiments of the present disclosure may further include: performing image processing on the text feature in the second image to generate a third image after text style conversion; and combining the third image with the target background image, to generate a fourth image after image style conversion.

Figure 8:
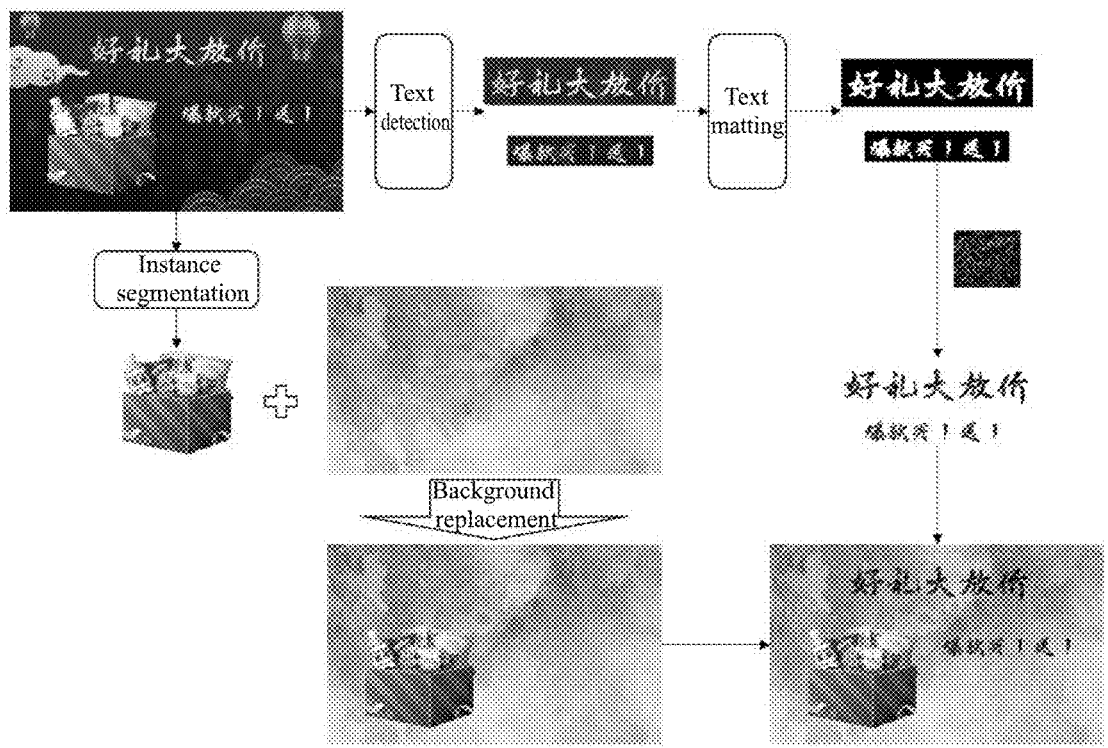
FIG. 8 shows an application flow chart of the text matting method according to embodiments of the present disclosure.

As an application scenario, the text mask obtained by using the text matting method according to the embodiment of the present disclosure may be used for implementing poster style conversion. FIG. 8 shows an application flow chart of using the text matting method according to the embodiment of the present disclosure; as shown in FIG. 8, the text matting method may be used for intelligent poster generation and style switching scenarios. With respect to advertisements or promotional pictures placed, image processing algorithms such as text detection and instance segmentation may be used firstly to extract text (e.g., "Good Gifts and Large Discounts!" and "Hot Sale, Two for One!") and a product feature map from a picture. Then, the detected detection image may undergo the above-described text matting process to obtain a text mask whose grayscale value is at an interval of 0 to 255. Next, intelligent matching of background and style may be performed based on current activity characteristics. For example, the original advertisement picture (the original image) in FIG. 8 shows a Spring Festival activity promotional style, which includes festive elements such as auspicious clouds and lanterns, with red and gold as main colors; however, there will be a sense of discord when the same poster content is applied to other festivals, such as International Women's Day. At this time, a new text color (e.g., a rose gold pattern shown in FIG. 8) suitable for the application scenario may be selected to perform text color conversion on the text mask obtained through text matting, and obtain a text mask after style conversion. In addition, a new background picture (e.g., a pinkish purple background picture) suitable for the application scenario may also be selected to replace the background of the product feature map obtained through instance segmentation. Finally, the text mask after style conversion and the product feature map after background replacement are combined to obtain a new poster picture after style switching, so as to implement an intelligent style switching application process; moreover, the personalized text feature and the product picture in the original image are preserved in the new poster picture; by changing the background picture with a pinkish purple tone and the text color with a rose gold pattern, the regenerated poster is made more in line with the atmosphere of International Women's Day.

Further, the text matting method according to some embodiments of the present disclosure may further include: performing image processing on the second image, to generate a mask image having a same image size as the original image; and using the mask image to perform image completion on the original image, so as to generate an original image after eliminating the text feature.

Figure 9:
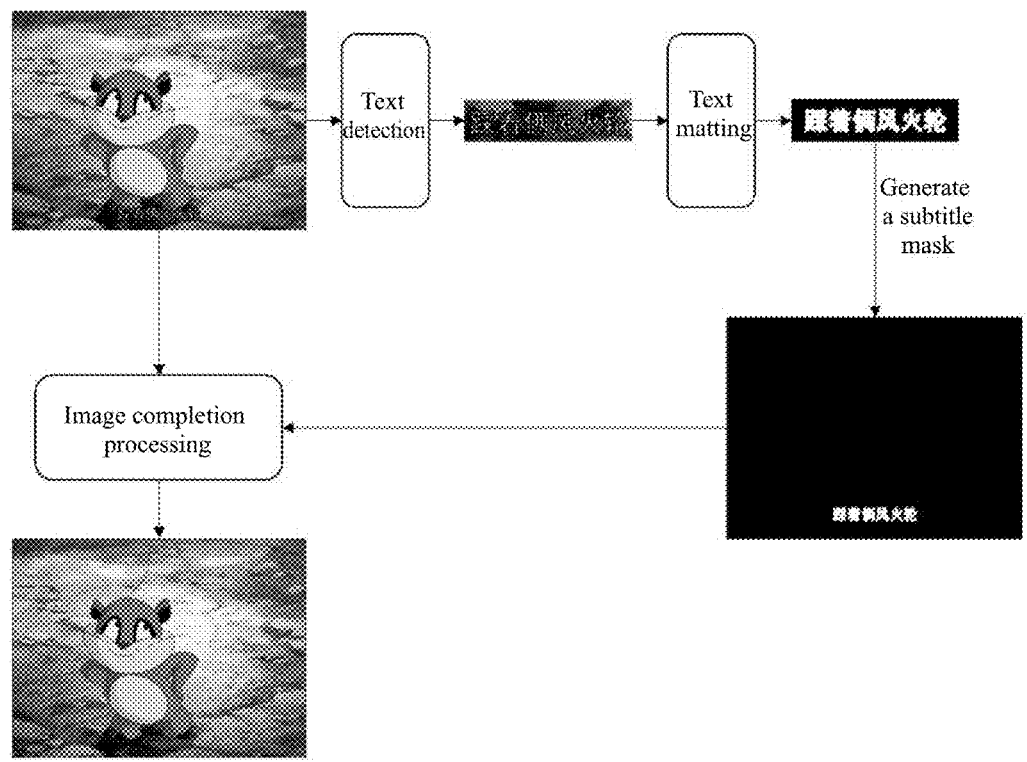
FIG. 9 shows another application flow chart of the text matting method according to embodiments of the present disclosure.

As another application scenario, the text mask obtained by using the text matting method according to the embodiment of the present disclosure may further be used for implementing picture or video subtitle elimination. FIG. 9 shows another application flow chart of using the text matting method according to the embodiment of the present disclosure; as shown in FIG. 9, the text matting method may be used for eliminating a subtitle in the original image. For some video images, for example, a video file having undergone multiple transformations and compressions, a subtitle thereof has been superimposed on a video picture, causing subtitle content to obstruct the video picture to a certain extent, which will have an impact on a subsequent video image editing and recreation process. Usually, a video editor covers or removes a subtitle by cropping the video picture or smearing with a brush, which, however, may make the picture not sufficiently complete or aesthetically pleasing. By using the text matting method according to the embodiment of the present disclosure combined with image completion technology, the video subtitle may be better removed while preserving a complete video picture.

As shown in FIG. 9, firstly, text detection may be performed on the original image to obtain a detection image including text; then, the text matting method according to the embodiment of the present disclosure may be applied to the detection image, to obtain the output text mask. To facilitate subtitle elimination in the original image, a subtitle mask is further generated based on a size of the original image; and an image size of the subtitle mask may be the same as an image size of the original image. Next, the generated subtitle mask is used to perform image completion on the original image, to obtain an image after subtitle elimination. Wherein, a process of implementing image completion will not be limited in the present disclosure, which, for example, may be implemented by using image completion technology based on a neural network. The image after subtitle elimination may have a same size as the original image, and preserve complete video image information. It may be understood that the text matting method according to the embodiments of the present disclosure may further be applied to other application scenarios, and no details will be repeated here. The text mask obtained by using the text matting method not only includes extracted text characters, but also preserves the unique text feature of the text of the original image, which is favorable for expanding the scope of personalized text application scenarios.

By using the text matting method based on the neural network according to some embodiments of the present disclosure, the neural network composed of the feature extraction network, the intermediate processing network and the feature fusion network may be used to perform text matting on the first image including text information, to extract the text feature in the first image, and obtain the second image including the text feature; and the output second image preserves personalized information such as font and color of the text, which is favorable for expanding application field and scope of the text feature. In addition, the intermediate processing network may serve as a connection layer between the feature extraction network and the feature fusion network to extract multi-scale intermediate features, thereby improving accuracy of text feature extraction.

According to another aspect of the present disclosure, some embodiments of the present disclosure further provide a text matting apparatus based on a neural network. Specifically, FIG. 10 shows a schematic block diagram of a text matting apparatus based on a neural network according to embodiments of the present disclosure.

Figure 10:
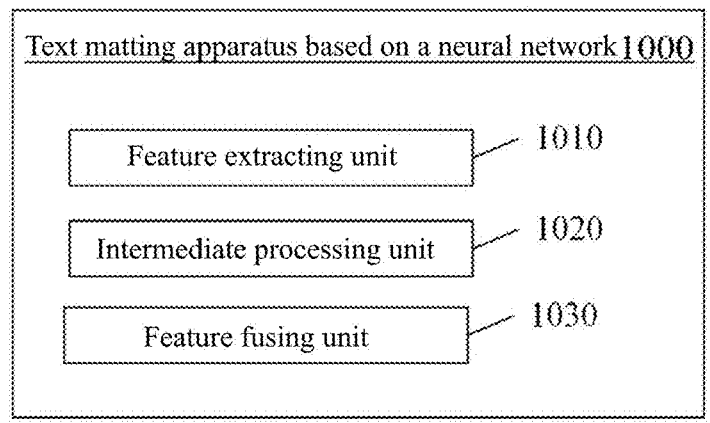
FIG. 10 shows a schematic block diagram of a text matting apparatus based on a neural network according to embodiments of the present disclosure.

As shown in FIG. 10, the apparatus 1000 may include a feature extracting unit 1010, an intermediate processing unit 1020, and a feature fusing unit 1030.

According to some embodiments of the present disclosure, the feature extracting unit 1010 may be configured to process a first image with a feature extraction network to obtain feature maps, wherein, the feature extraction network includes sequentially connected n extraction convolutional network blocks, wherein, a 1-st extraction convolutional network block processes the first image and outputs a 1-st feature map, and an i-th extraction convolutional network block processes an (i–1)-th feature map and outputs an i-th feature map, where, N is an integer greater than 1, and i is an integer greater than 1 but less than or equal to n.

According to some embodiments of the present disclosure, the intermediate processing unit 1020 may be configured to process the feature maps with an intermediate processing network to obtain intermediate feature maps, wherein, the intermediate processing network includes n spatial convolutional network blocks, wherein, a 1-st spatial convolutional network block processes the 1-st feature map and outputs a 1-s/intermediate feature map, and an i-th spatial convolutional network block processes the i-th feature map and outputs an i-th intermediate feature map.

According to some embodiments of the present disclosure, the feature fusing unit 1030 may be configured to process the intermediate feature maps with a feature fusion network to obtain a second image, wherein, the feature fusion network includes sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n–i+1)-th intermediate feature map output by an (n–i+1)-th spatial convolutional network block and an (i–1)-th fusion map output by an (i–1)-th fusion convolutional network block to obtain an i-th fusion map, wherein, an n-th fusion map output by an n-th fusion convolutional network block serves as the second image; and the second image includes a text feature extracted from the first image.

The above description in conjunction with FIG. 1 may be referred to for a specific implementation process of the feature extracting unit 1010, the intermediate processing unit 1020 and the feature fusing unit 1030 in the text matting apparatus 1000 according to the embodiments of the present disclosure, and no details will be repeated here.

According to some embodiments of the present disclosure, the n extraction convolutional network blocks in the feature extraction network are each composed of one or more of a convolutional layer, a pooling layer and a residual convolutional block; and the n fusion convolutional network blocks in the feature fusion network are each composed of one or more of a convolutional layer, a residual convolutional block and a first connection layer; wherein, the first connection layer includes a feature merging layer and a super-resolution layer.

According to some embodiments of the present disclosure, n is equal to 4; in the feature extraction network, the 1-st extraction convolutional network block is composed of a convolutional layer and a maximum pooling layer, a 2-nd extraction convolutional network block is composed of a residual convolutional block, a convolutional layer and a maximum pooling layer, a 3-rd extraction convolutional network block is composed of a residual convolutional block, a convolutional layer and a maximum pooling layer, and a 4-th extraction convolutional network block is composed of a residual convolutional block and a convolutional layer; wherein, in the feature fusion network, a 1-st fusion convolutional network block is composed of a convolutional layer and a residual convolutional block, a 2-nd fusion convolutional network block is composed of a first connection layer, a convolutional layer and a residual convolutional block, a 3-rd fusion convolutional network block is composed of a first connection layer, a convolutional layer and a residual convolutional block, and a 4-th fusion convolutional network block is composed of a first connection layer and a convolutional layer, wherein, the first connection layer includes a feature merging layer and a super-resolution layer.

According to some embodiments of the present disclosure, the feature merging layer is used for merging a plurality of input images by increasing the number of image channels; and the super-resolution layer is used for increasing the image size by reducing the number of image channels, wherein, the residual convolutional block is composed of a convolutional layer, a batch normalization layer and an activation function.

According to some embodiments of the present disclosure, pixel points of the n-th fusion map are represented as text probability values located in an interval of 0 to 1, and are quantified as a grayscale image in an interval of 0 to 255.

According to some embodiments of the present disclosure, the n spatial convolutional network blocks have a same structure; each spatial convolutional network block of the n spatial convolutional network blocks includes m parallel processing units and a second connection layer; the m processing units are respectively used for processing the input image; and the second connection layer is used for merging processing results of the m processing units, wherein, the second connection layer includes a feature merging layer, a convolutional layer and a batch normalization layer, wherein, the feature merging layer is used for merging the m images respectively output by the m processing units by increasing the number of image channels, where, m is an integer greater than 1.

According to some embodiments of the present disclosure, m is equal to 5; in each spatial convolutional network block, a 1-st processing unit is composed of a first convolutional layer and a batch normalization layer sequentially connected; a 2-nd processing unit is composed of a second convolutional layer, a batch normalization layer, a third convolutional layer and a batch normalization layer sequentially connected; a 3-rd processing unit is composed of a fourth convolutional layer, a batch normalization layer, a third convolutional layer and a batch normalization layer sequentially connected; a 4-th processing unit is composed of a fifth convolutional layer, a batch normalization layer, a third convolutional layer and a batch normalization layer sequentially connected; and a fifth processing unit is composed of a batch normalization layer, an adaptive average pooling layer, a third convolutional layer and an upsampling layer sequentially connected; wherein the first convolutional layer, the second convolutional layer, the third convolutional layer, the fourth convolutional layer, and the fifth convolutional layer have different network parameters.

The above description in conjunction with FIG. 2 to FIG. 5 may be referred to for a network structure and network parameter design of the feature extraction network, the intermediate processing network and the feature fusion network for the text matting task performed in the text matting apparatus 1000 according to the embodiments of the present disclosure, and no details will be repeated here.

According to some embodiments of the present disclosure, the apparatus 1000 may further include a training unit; and the training unit is configured to: generate a training image set and annotate training images in the training image set to generate corresponding mask images; and train, based on a training function, the feature extraction network, the intermediate processing network and the feature fusion network with the training image set.

According to some embodiments of the present disclosure, the generating, by the training unit, the training image set, includes: constructing a corpus composed of text characters, a font database composed of text fonts, a texture feature database composed of text colors, and a background database composed of background pictures; and randomly selecting a group of a text character, a text font, a text color, and a background picture from the corpus, the font database, the texture feature database, and the background database, and forming a training image, wherein, the text characters include Chinese characters and English characters, the text fonts include Chinese fonts and English fonts, and the text colors include solid colors, textures, and patterns. The above description in conjunction with FIG. 6 and FIG. 7 may be referred to for a specific implementation process of the text matting apparatus 1000 according to the embodiment of the present disclosure, and no details will be repeated here.

According to some embodiments of the present disclosure, the apparatus 1000 may further include an image processing unit; and the image processing unit is configured to: perform text detection on an original image, for extracting a detection image including texts from the original image, wherein, the detection image serves as the first image.

According to some embodiments of the present disclosure, the image processing unit may further be configured to: perform image processing on the text feature in the second image to generate a third image after text style conversion; and combine the third image with a target background image, to generate a fourth image after image style conversion. The above description in conjunction with FIG. 8 may be referred to for implementation and effects of the part of solution, and no details will be repeated here.

According to some embodiments of the present disclosure, the image processing unit may further be configured to: perform image processing on the second image, to generate a mask image having a same image size as the original image; and perform image completion on the original image with the mask image to generate an original image after eliminating the text feature. The above description in conjunction with FIG. 9 may be referred to for implementation and effects of the part of solution, and no details will be repeated here.

By using the text matting apparatus based on the neural network according to some embodiments of the present disclosure, the neural network composed of the feature extraction network, the intermediate processing network and the feature fusion network may be used to perform text matting on the first image including text information, to extract the text feature in the first image, and obtain the second image including the text feature; and the output second image preserves personalized information such as font and color of the text, which is favorable for expanding application field and scope of the text feature. In addition, the intermediate processing network may serve as a connection layer between the feature extraction network and the feature fusion network to extract multi-scale intermediate features, thereby improving accuracy of text feature extraction.

Figure 11:
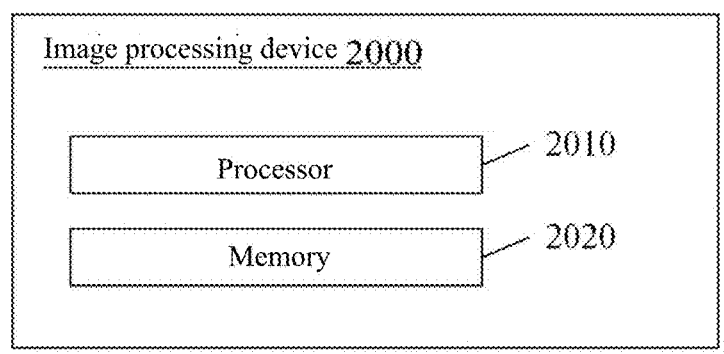
FIG. 11 shows a schematic block diagram of an image processing device according to embodiments of the present disclosure.

According to still another aspect of the present disclosure, there is further provided an image processing device. FIG. 11 shows a schematic block diagram of an image processing device according to embodiments of the present disclosure.

As shown in FIG. 11, the device 2000 may include a processor 2010 and a memory 2020. According to the embodiments of the present disclosure, the memory 2020 has computer-readable codes stored therein; and when run by the processor 2010, the computer-readable codes execute the text matting method as described above.

The processor 2010 may execute various actions and processes based on the programs stored in the memory 2020. Specifically, the processor 2010 may be an integrated circuit chip, and has signal processing capabilities. The above-described processor may be a general-purpose processor, a Digital Signal Processor (DSP), an Application Specific Integrated Circuit (ASIC), a Field Programmable Gate Array (FPGA) or other programmable logic device, a discrete gate or a transistor logic device, and a discrete hardware component. Various methods, steps, and logical block diagrams disclosed in the embodiments of the present disclosure may be implemented or executed. The general-purpose processor may be a microprocessor, or the processor any also be any conventional processor, etc.

The memory 2020 has computer-executable instruction codes stored therein; and when executed by the processor 2010, the instruction codes may implement the text matting method according to the embodiments of the present disclosure. The memory 2020 may be a volatile memory or a non-volatile memory, or may include both the volatile memory and the non-volatile memory. The non-volatile memory may be a Read Only Memory (ROM), a Programmable Read Only Memory (PROM), an Erasable Programmable Read Only Memory (EPROM), an Electrically Erasable Programmable Read Only Memory (EEPROM) or a flash memory. The volatile memory may be a Random Access Memory (RAM), which is used as an external cache. By way of illustration but not limitation, many forms of RAM are available, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchronous Link Dynamic Random Access Memory (SLDRAM), and a Direct Rambus Random Access Memory (DRRAM). It should be noted that the memories as described herein are intended to include, but are not limited to, these and any other suitable types of memories.

As an example, the image processing device may be implemented as a Central Processing Unit (CPU), which may serve as a computing and control core of a computer system and is a final execution unit for information processing and program execution. Or, the image processing device may also be implemented as a Graphics Processing Unit (GPU), serving as microprocessors specialized in performing image and graphics related operations on personal computers, workstations, game consoles, and some mobile devices.

Figure 12:
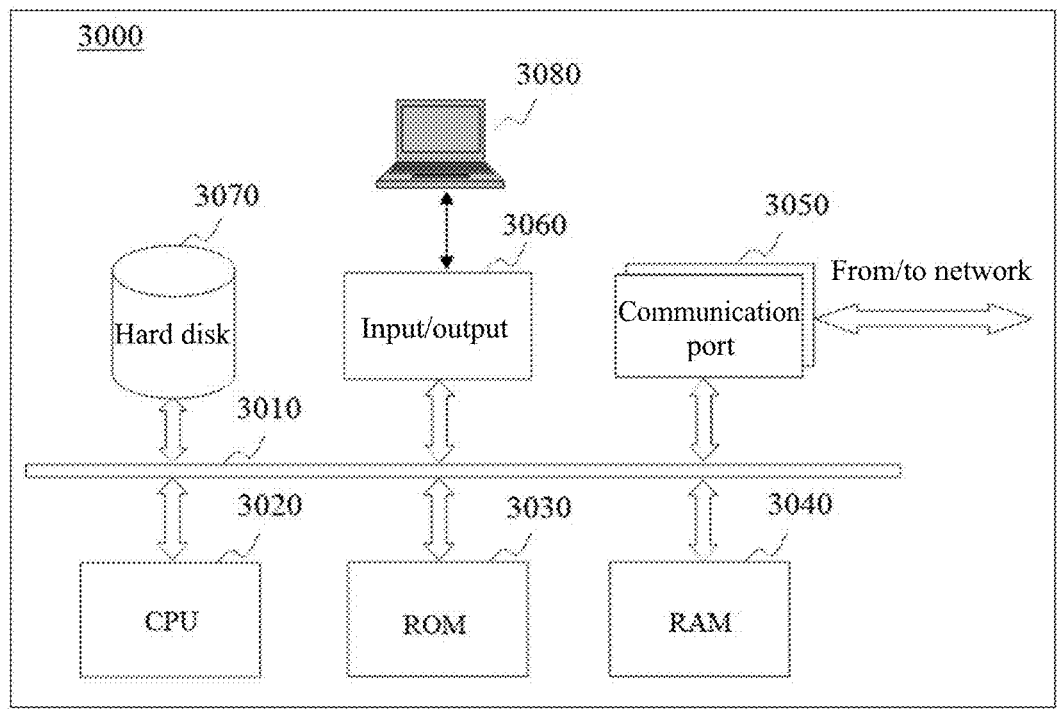
FIG. 12 shows a schematic diagram of an architecture of an exemplary computing device according to embodiments of the present disclosure.

The text matting method, the text matting apparatus, or the device according to the embodiments of the present disclosure may also be implemented by the architecture of a computing device 3000 shown in FIG. 12. As shown in FIG. 12, the computing device 3000 may include a bus 3010, one or more CPUs 3020, a Read-Only Memory (ROM) 3030, a Random Access Memory (RAM) 3040, a communication port 3050 coupled to the network, an input/output component 3060, a hard disk 3070, etc. The storage device in the computing device 3000, for example, the ROM 3030 or the hard disk 3070, may store various data or files as well as program instructions executed by the CPU, that are used for processing and/or communication of the text matting method provided by the present disclosure. The computing device 3000 may further include a user interface 3080. Of course, the architecture shown in FIG. 12 is only exemplary; when implementing different devices, one or more components of the computing devices shown in FIG. 12 may be omitted according to actual needs.

Figure 13:
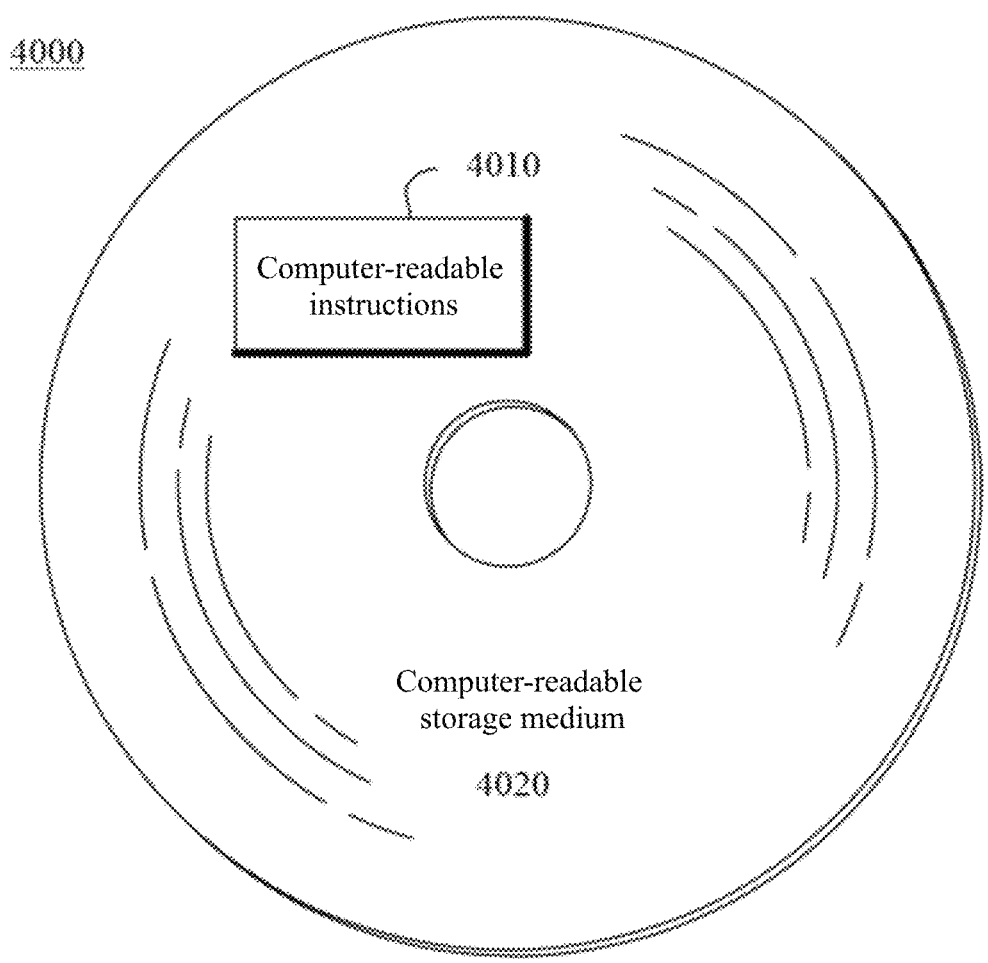
FIG. 13 shows a schematic diagram of a computer storage medium according to embodiments of the present disclosure.

According to still another aspect of the present disclosure, there is further provided a non-transitory computer-readable storage medium. FIG. 13 shows a schematic diagram 4000 of a storage medium according to the present disclosure.

As shown in FIG. 13, the computer storage medium 4020 has computer-readable instructions 4010 stored thereon. When run by the processor, the computer-readable instructions 4010 may execute the text matting method as described with reference to the above accompanying drawings. The computer-readable storage medium includes but is not limited to, for example, a volatile memory and/or a non-volatile memory. The volatile memory may include, for example, a Random Access Memory (RAM) and/or a cache. The non-volatile memory may include, for example, a Read-Only Memory (ROM), a hard disk, a flash memory, etc. For example, the computer storage medium 4020 may be coupled to a computing device such as a computer; next, in a case where the computing device runs the computer-readable instructions 4010 stored on the computer storage medium 4020, the above-described text matting method provided according to the embodiments of the present disclosure may be performed.

Those skilled in the art can understand that the content disclosed in this disclosure can undergo various variations and improvements. For example, the various devices or components described above can be implemented through hardware, software, firmware, or some or all of the combination.

Furthermore, although various references have been made to certain units in the system according to the disclosed embodiments, any number of different units can be used and run on clients and/or servers. Units are only illustrative, and different aspects of systems and methods can use different units.

Those skilled in the art can understand that all or part of the steps in the above methods can be completed by instructing the relevant hardware through a program, which can be stored in a computer-readable storage medium, such as read-only memory, magnetic disk, or optical disc. Optionally, all or part of the steps of the above embodiments can also be implemented using one or more integrated circuits. Correspondingly, the modules/units in the above embodiments can be implemented in the form of hardware or software functional circuits. This disclosure is not limited to any specific form of combination of hardware and software.

Unless otherwise defined, all terms used herein (including technical and scientific terms) have the same meaning as those commonly understood by ordinary technical personnel in the field to which this disclosure belongs. It should also be understood that terms such as those defined in regular dictionaries should be interpreted as having meanings that are consistent with their meanings in the context of the relevant technology, and should not be interpreted in idealized or overly formal terms, unless explicitly defined here.

The above is an explanation of this disclosure and should not be considered as a limitation. Although several exemplary embodiments of the present disclosure have been described, those skilled in the art will easily understand that many modifications can be made to the exemplary embodiments without departing from the novel teaching and advantages of the present disclosure. Therefore, all these modifications are intended to be included within the scope of this disclosure as limited by the claims. It should be understood that the above is an explanation of the present disclosure and should not be considered limited to the specific embodiments disclosed, and the intention to modify the disclosed embodiments and other embodiments is included within the scope of the attached claims. This disclosure is limited by the claims and their equivalents.

What is claimed is:

1. A text matting method based on a neural network, comprising:
    processing a first image with a feature extraction network to obtain feature maps, wherein, the feature extraction network comprises sequentially connected n extraction convolutional network blocks, and wherein a 1-st extraction convolutional network block processes the first image and outputs a 1-st feature map, and an i-th extraction convolutional network block processes an (i−1)-th feature map and outputs an i-th feature map;
    processing the feature maps with an intermediate processing network to obtain intermediate feature maps, wherein, the intermediate processing network comprises n spatial convolutional network blocks, a 1-st spatial convolutional network block processes the 1-st feature map and outputs a 1-st intermediate feature map, and an i-th spatial convolutional network block processes the i-th feature map and outputs an i-th intermediate feature map; and
    processing intermediate feature maps with a feature fusion network to obtain a second image, wherein, the feature fusion network comprises sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n−i+1)-th intermediate feature map output by an (n−i+1)-th spatial convolutional network block and an (i−1)-th fusion map output by an (i−1)-th fusion convolutional network block to obtain an i-th fusion map, wherein an n-th fusion map output by an n-th fusion convolutional network block serves as the second image, and the second image comprises a text feature extracted from the first image, and wherein n is an integer greater than 1, and i is an integer greater than 1 but less than or equal to n.

2. The method according to claim 1, wherein, the n extraction convolutional network blocks in the feature extraction network are each composed of one or more of a convolutional layer, a pooling layer and a residual convolutional block; and the n fusion convolutional network blocks in the feature fusion network are each composed of one or more of a convolutional layer, a residual convolutional block and a first connection layer; wherein the first connection layer comprises a feature merging layer and a super-resolution layer.

3. The method according to claim 2, wherein, the feature merging layer is used for merging a plurality of input images by increasing a number of image channels; and the super-resolution layer is used for increasing image size by reducing the number of image channels, the residual convolutional block is composed of a convolutional layer, a batch normalization layer and an activation function.

4. The method according to claim 1, wherein, n is equal to 4; in the feature extraction network, the 1-st extraction convolutional network block is composed of a convolutional layer and a maximum pooling layer, a 2-nd extraction convolutional network block is composed of a residual convolutional block, a convolutional layer and a maximum pooling layer, a 3-rd extraction convolutional network block is composed of a residual convolutional block, a convolutional layer and a maximum pooling layer, and a 4-th extraction convolutional network block is composed of a residual convolutional block and a convolutional layer, wherein in the feature fusion network, a 1-st fusion convolutional network block is composed of a convolutional layer and a residual convolutional block, a 2-nd fusion convolutional network block is composed of a first connection layer, a convolutional layer and a residual convolutional block, a 3-rd fusion convolutional network block is composed of a first connection layer, a convolutional layer and a residual convolutional block, and a 4-th fusion convolutional network block is composed of a first connection layer and a convolutional layer, the first connection layer comprises a feature merging layer and a super-resolution layer.

5. The method according to claim 4, wherein, the feature merging layer is used for merging a plurality of input images by increasing a number of image channels; and the super-resolution layer is used for increasing image size by reducing the number of image channels, the residual convolutional block is composed of a convolutional layer, a batch normalization layer and an activation function.

6. The method according to claim 1, wherein, the n spatial convolutional network blocks have a same structure; each spatial convolutional network block of the n spatial convolutional network blocks comprises m parallel processing units and a second connection layer; the m processing units are respectively used for processing an input image; the second connection layer is used for merging processing results of the m processing units; the second connection layer comprises a feature merging layer, a convolutional layer and a batch normalization layer; and the feature merging layer is used for merging m images respectively output by the m processing units by increasing a number of image channels, wherein m is an integer greater than 1.

7. The method according to claim 6, wherein, m is equal to 5; in each spatial convolutional network block, a 1-st processing unit is composed of a first convolutional layer and a batch normalization layer sequentially connected; a 2-nd processing unit is composed of a second convolutional layer, a batch normalization layer, a third convolutional layer and a batch normalization layer sequentially connected; a 3-rd processing unit is composed of a fourth convolutional layer, a batch normalization layer, a third convolutional layer and a batch normalization layer sequentially connected; a 4-th processing unit is composed of a fifth convolutional layer, a batch normalization layer, a third convolutional layer and a batch normalization layer sequentially connected; and a fifth processing unit is composed of a batch normalization layer, an adaptive average pooling layer, a third convolutional layer and an upsampling layer sequentially connected; and wherein the first convolutional layer, the second convolutional layer, the third convolutional layer, the fourth convolutional layer, and the fifth convolutional layer have different network parameters.

8. The method according to claim 1, wherein, pixel points of the n-th fusion map are represented as text probability values located in an interval of 0 to 1, and are quantified as a grayscale image in an interval of 0 to 255.

9. The method according to claim 1, further comprising:
generating a training image set and annotating training images in the training image set to generate corresponding mask images; and training, based on a training function, the feature extraction network, the intermediate processing network and the feature fusion network with the training image set.

10. The method according to claim 9, wherein, the generating the training image set comprises:
constructing a corpus composed of text characters, a font database composed of text fonts, a texture feature database composed of text colors, and a background database composed of background pictures; and randomly selecting a group of a text character, a text font, a text color, and a background picture from the corpus, the font database, the texture feature database, and the background database, and forming a training image, wherein the text characters comprise Chinese characters and English characters; the text fonts comprise Chinese fonts and English fonts; and the text colors comprise solid colors, textures, and patterns.

11. The method according to claim 1, further comprising:
performing text detection on an original image, for extracting a detection image comprising texts from the original image, wherein, the detection image serves as the first image.

12. The method according to claim 11, further comprising:
- performing image processing on the text feature of the second image to generate a third image after text style conversion; and
- combining the third image with a target background image, to generate a fourth image after image style conversion.

13. The method according to claim 11, further comprising:
- performing image processing on the second image, to generate a mask image having a same image size as the original image; and
- performing image completion on the original image with the mask image to generate an original image after eliminating the text feature.

14. A non-transitory computer-readable storage medium with instructions stored thereon, wherein the instructions upon execution by a processor, cause the processor to perform the text matting method according to claim 1.

15. A text matting apparatus based on a neural network, comprising:
- a feature extracting unit, configured to process a first image with a feature extraction network to obtain feature maps, wherein the feature extraction network comprises sequentially connected n extraction convolutional network blocks, and wherein a 1-st extraction convolutional network block processes the first image and outputs a 1-st feature map, and an i-th extraction convolutional network block processes an (i−1)-th feature map and outputs an i-th feature map;
- an intermediate processing unit, configured to process the feature maps with an intermediate processing network to obtain intermediate feature maps, wherein the intermediate processing network comprises n spatial convolutional network blocks, a 1-st spatial convolutional network block processes the 1-st feature map and outputs a 1-st intermediate feature map, and an i-th spatial convolutional network block processes the i-th feature map and outputs an i-th intermediate feature map; and
- a feature fusing unit, configured to process the intermediate feature maps with a feature fusion network to obtain a second image, wherein, the feature fusion network comprises sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n−i+1)-th intermediate feature map output by an (n−i+1)-th spatial convolutional network block and an (i−1)-th fusion map output by an (i−1)-th fusion convolutional network block to obtain an i-th fusion map,
- wherein, an n-th fusion map output by an n-th fusion convolutional network block serves as the second image; and the second image comprises a text feature extracted from the first image, and
- wherein n is an integer greater than 1, and i is an integer greater than 1 but less than or equal to n.

16. An image processing device, comprising:
- a processor; and
- a memory with computer-readable codes stored thereon, wherein the computer-readable codes, upon executed by the processor, cause the processor to:
- process a first image with a feature extraction network to obtain feature maps, wherein, the feature extraction network comprises sequentially connected n extraction convolutional network blocks, and wherein a 1-st extraction convolutional network block processes the first image and outputs a 1-st feature map, and an i-th extraction convolutional network block processes an (i−1)-th feature map and outputs an i-th feature map;
- process the feature maps with an intermediate processing network to obtain intermediate feature maps, wherein, the intermediate processing network comprises n spatial convolutional network blocks, a 1-st spatial convolutional network block processes the 1-st feature map and outputs a 1-st intermediate feature map, and an i-th spatial convolutional network block processes the i-th feature map and outputs an i-th intermediate feature map; and
- process intermediate feature maps with a feature fusion network to obtain a second image, wherein, the feature fusion network comprises sequentially connected n fusion convolutional network blocks, a 1-st fusion convolutional network block processes an n-th intermediate feature map output by an n-th spatial convolutional network block to obtain a 1-st fusion map, an i-th fusion convolutional network block processes an (n−i+1)-th intermediate feature map output by an (n−i+1)-th spatial convolutional network block and an (i−1)-th fusion map output by an (i−1)-th fusion convolutional network block to obtain an i-th fusion map,
- wherein an n-th fusion map output by an n-th fusion convolutional network block serves as the second image, and the second image comprises a text feature extracted from the first image, and
- wherein n is an integer greater than 1, and i is an integer greater than 1 but less than or equal to n.

* * * * *